United States Patent [19]

Robinson

[11] Patent Number: 5,574,472

[45] Date of Patent: Nov. 12, 1996

[54] SIMPLIFIED SPACECRAFT ANTENNA REFLECTOR FOR STOWAGE IN CONFINED ENVELOPES

[75] Inventor: Stephen A. Robinson, Sepulveda, Calif.

[73] Assignee: Hughes Electronics, Los Angeles, Calif.

[21] Appl. No.: 491,331

[22] Filed: Jun. 30, 1995

Related U.S. Application Data

[63] Continuation of Ser. No. 766,369, Sep. 27, 1991, abandoned.

[51] Int. Cl.[6] .................................................. H01Q 15/20
[52] U.S. Cl. .................................. 343/915; 343/DIG. 2; 342/8; 29/600
[58] Field of Search ............................ 343/915, DIG. 2, 343/916; 342/5, 8, 10; 29/600

[56] References Cited

U.S. PATENT DOCUMENTS

| 3,496,687 | 2/1970 | Greenberg et al. | 343/915 |
|---|---|---|---|
| 3,541,569 | 11/1970 | Berks et al. | 343/915 |
| 4,115,784 | 9/1978 | Schwerdtfeger et al. | 343/915 |
| 4,683,475 | 7/1987 | Luly | 343/915 |
| 4,796,033 | 1/1989 | Rubin et al. | 343/915 |
| 4,804,971 | 2/1989 | Bruns et al. | 343/840 |

FOREIGN PATENT DOCUMENTS

| 0178706 | 9/1985 | Japan | 343/915 |
|---|---|---|---|

*Primary Examiner*—Donald T. Hajec
*Assistant Examiner*—Tan Ho
*Attorney, Agent, or Firm*—T. Gudmestad; W. K. Denson-Low

[57] ABSTRACT

A method for stowing a unitary flexible antenna reflector 10 in a confining envelope and deploying the reflector from the envelope. In a most general sense, the invention includes the steps of: a) applying a deforming force to diametrically opposed positions 16 and 18 near an edge of the reflector 10 to place the reflector in a deformed state; b) maintaining the reflector 10 in the deformed state until deployment; and c) releasing the reflector 10 from the deformed state. In a specific embodiment, the step of maintaining the reflector 10 in a deformed state includes the step of attaching a restraining element between the diametrically opposed positions on the edge of the reflector which is released on deployment.

4 Claims, 2 Drawing Sheets

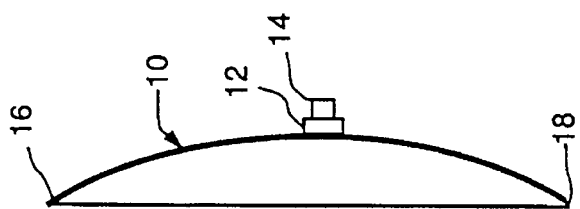
FIG. 1(b).
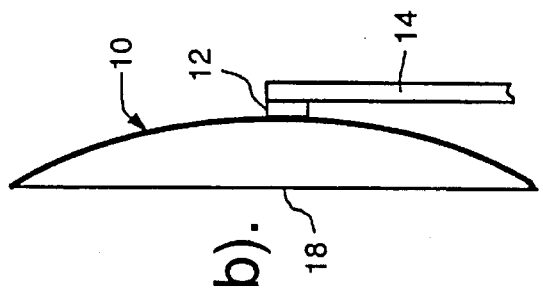
FIG. 1(c).
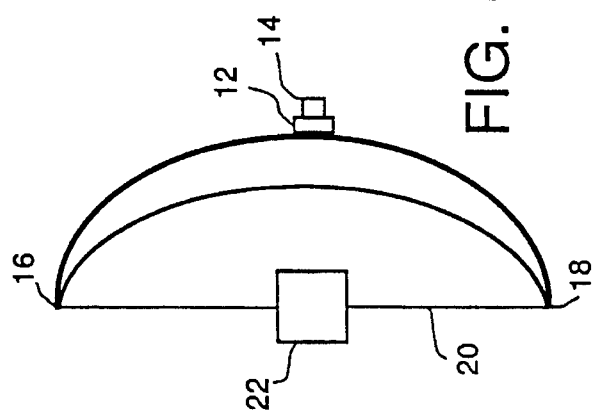
FIG. (2a).
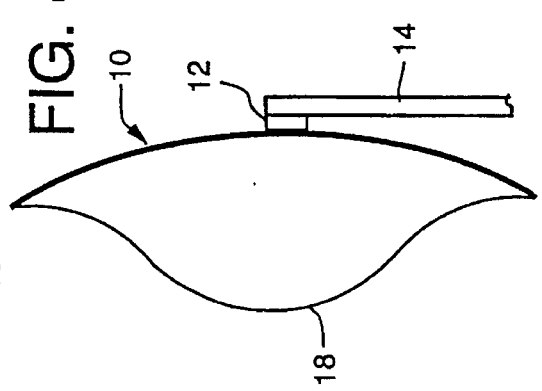
FIG. (2b).
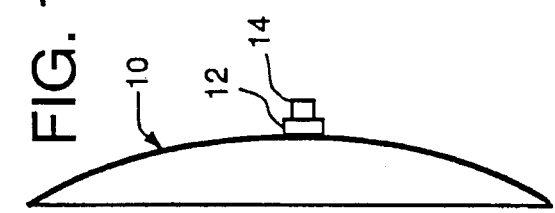
FIG. 3(a).
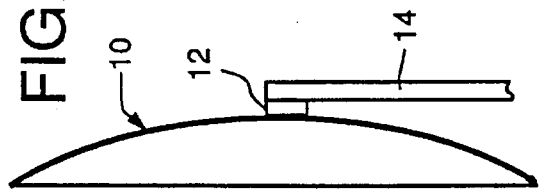
FIG. 3(b).

5,574,472

SIMPLIFIED SPACECRAFT ANTENNA REFLECTOR FOR STOWAGE IN CONFINED ENVELOPES

This is continuation of application Ser. No. 766,369, filed Sep. 27 1991 now abandoned.

BACKGROUND OF THE INVENTION

1. Field of the Invention

This invention relates to spacecraft antenna reflectors. In particular, the present invention relates to a simplified design for spacecraft antenna reflectors to facilitate stowage and deployment from protective, confined launch envelopes.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

Spacecraft antenna reflectors are typically constructed as concave disks. Electrical specifications for the reflector dictate disk dimensions, Specifically diameter and cross-sectional curvature. Spacecraft payload weight limits often constrain the reflector thickness to a level that renders the reflector vulnerable to dynamic forces associated spacecraft launch. Atmospheric drag and launch booster vibration may be particularly damaging to the reflector if the reflector is mounted in a typical operational configuration (i.e., on support towers on the external surface of the spacecraft) during launch. It is therefore desirable to stow the reflectors in a confining envelope designed to protect the reflectors from launch stress.

The shape of the confining envelope requires that the intrinsic antenna reflector shape be temporarily modified to fit inside the envelope during launch. After launch, the reflector is released from the envelope and returned to the original shape thereof on deployment.

In accordance with conventional teachings, the antenna reflectors are designed with additional components to facilitate reflector shape modification for stowage. One often used approach is to use a segmented reflector with a cantilevered rib frame which unfolds on deployment as an umbrella unfolds. These designs, however, are costly, complicate reflector manufacture, and require complex systems for folding and unfolding the reflectors for proper stowage and deployment.

Therefore, while certain techniques may be known in the art for stowage and deployment of spacecraft antenna reflectors, a need remains in the art for further advancements.

SUMMARY OF THE INVENTION

The need in the art is addressed by the present invention which provides a method for stowing a unitary flexible antenna reflector in a confining envelope and deploying the reflector from the envelope. In a most general sense, the invention includes the steps of: a) applying a deforming force to diametrically opposed positions near an edge of the reflector to place the reflector in a deformed state; b) maintaining the reflector in the deformed state until deployment; and c) releasing the reflector from the deformed state. In a specific embodiment, the step of maintaining the reflector in a deformed state includes the step of attaching a restraining element between the diametrically opposed positions on the edge of the reflector which is released on deployment.

BRIEF DESCRIPTION OF THE DRAWINGS

FIG. 1(b) is a top view of the illustrative embodiment of the inventive antenna reflector in a manufactured configuration.

FIG. 1(c) is a side view of the illustrative embodiment of the inventive antenna reflector in a manufactured configuration.

FIG. 2(a) is a top view of the illustrative embodiment of the inventive antenna reflector in a stowed configuration.

FIG. 2(b) is a side view of the illustrative embodiment of the inventive antenna reflector in a stowed configuration.

FIG. 3(a) is a top view of the illustrative embodiment of the inventive antenna reflector in a deployed configuration.

FIG. 3(b) is a side view of the illustrative embodiment of the inventive antenna reflector in a deployed configuration.

DETAILED DESCRIPTION OF THE INVENTION

Figure 1A:
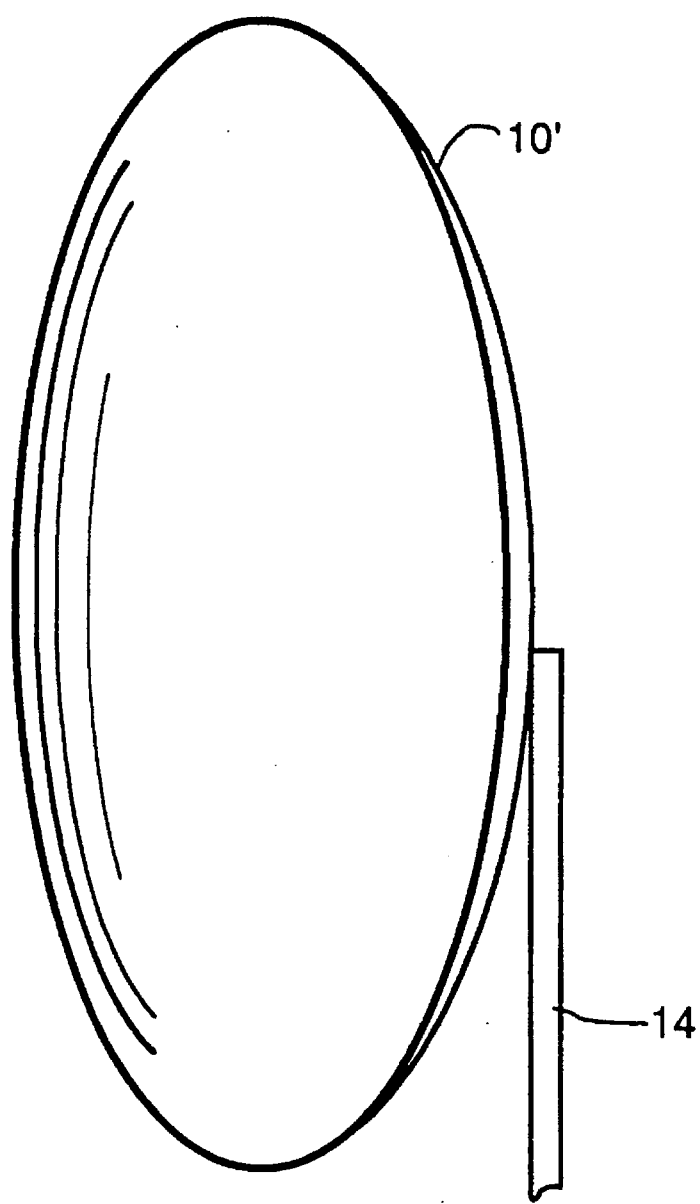
FIG. 1(a) is a simplified perspective view of an illustrative embodiment of the inventive antenna reflector in a manufactured configuration.

In accordance with the present teachings, an antenna reflector is provided with elastic characteristics which allow the shape of the reflector to be redefined for stowage and returned to an original shape on deployment.

FIG. 1(a) is a simplified perspective diagram of an illustrative embodiment of the flexible thin-shell antenna reflector 10 of the present invention in a manufactured configuration. FIG. 1(b) is a top view of the illustrative embodiment of the inventive antenna reflector 10 in a manufactured configuration. FIG. 1(c) is a side view of the illustrative embodiment of the inventive antenna reflector in a manufactured configuration. As shown in FIGS. 1(a)–(c), in the illustrative embodiment, the reflector 10 is a parabolic shell having a coupling fixture 12 attached to the center thereof to which a support mast 14 is coupled.

The reflector 10 is constructed of a single thin, concave homogeneous sheet of a flexible, semi-rigid material such as graphite-fiber reinforced plastic. The reflector 10 may be fabricated in a conventional manner, i.e., multi-layer lamination over a precision form of the correct shape. The dimensions of the reflector 10 may be determined in a conventional manner. The reflector may be made of conductive material or nonconductive material which is coated with conductive material.

In accordance with the present teachings, a design consideration of significant import is that the reflector 10 be sufficiently flexible to be deformed into a stowage shape and deployed to a fully nondeformed state on deployment. This requires a construction in which the deformation strain on the reflector is below the creep strain limit, that is, the force level at which the reflector will not return to the original shape.

FIG. 2(a) is a top view of the illustrative embodiment of the inventive antenna reflector 10 in a stowed (deformed) configuration. FIG. 2(b) is a side view having a substantially U-spaped cross-section of the illustrative embodiment of the inventive antenna reflector 10 in the stowed configuration. FIG. 3(a) is a top view of the illustrative embodiment of the inventive antenna reflector in a deployed configuration and FIG. 10 3(b) is a side view of the illustrative embodiment of the inventive antenna reflector in the deployed configuration.

As illustrated in FIG. 2(a), the reflector 10 is deformed by the application of a uniform force at diametrically opposed points 16 and 18 at the periphery of the reflector 10. The reflector 10 may be maintained in the stowed configuration by a string 20 as shown in FIG. 2(a) or by a container (not shown) in which the reflector 10 is stowed, e.g., the side rails of a space shuttle. If a string is used, it may be cut by a pyrotechnic device 22. In the alternative, a material may be chosen for the reflector 10 which allows the reflector to be deformed at one temperature and maintained in the deformed state until deployed at another temperature. In short, the invention is not limited to the manner in which the reflector is maintained in a deformed state and deployed.

Thus, the teachings of the current invention obviate the disadvantages of the segmented design by providing a single-piece homogeneous reflector can be fabricated using existing manufacturing processes, which can be deformed to fit into a protective launch envelope and returned to the desired shape upon deployment. No excess weight from cantilevers and motors is necessary, no motor control systems are required to perform stowage deformation or redeployment, and the lack of segmentation virtually eliminates possible catenation effects. The present invention allows for the elimination of the manufacturing steps required for segmenting conventional reflectors, including costly cantilevers, ribs, and motor and control systems, and therefore allows for significant cost savings.

While the present invention has been described herein with reference to a particular embodiment for a particular application, those having ordinary skill in the art and access to the present teachings will recognize additional modifications applications and embodiments within the scope thereof.

It is therefore intended by the appended claims to cover any and all such applications, modifications and embodiments within the scope of the present invention. Accordingly,

What is claimed is:

1. A method for stowing an antenna reflector, comprising the steps of:

providing a flexible antenna having a periphery;

deforming said flexible antenna reflector into a U-shaped configuration;

maintaining said flexible antenna reflector in the U-shaped configuration by attaching a string between diametrically opposed points at the periphery of the reflector; and releasing said flexible antenna reflector from the maintained deformed state.

2. The method defined in claim 1 wherein said releasing step is carried out by cutting the string with a pyrotechnic device.

3. An antenna reflector storage arrangement comprising:

an antenna reflector having an original shape with a predetermined creep strain;

a string attached across the reflector for holding said antenna reflector in a deformed U-shaped configuration wherein the deformation strain is less than the predetermined creep strain of the antenna reflector; and means for releasing said antenna reflector from the deformed U-shaped configuration to its original shape.

4. The antenna reflector defined in claim 3 wherein the releasing means comprises a pyrotechnic device for cutting the string.

* * * * *